(12) United States Patent
Zavesky et al.

(10) Patent No.: US 11,113,472 B2
(45) Date of Patent: Sep. 7, 2021

(54) CONTENT CURATION FOR COURSE GENERATION

(71) Applicant: AT&T Intellectual Property I, L.P., Atlanta, GA (US)

(72) Inventors: Eric Zavesky, Austin, TX (US); Zhu Liu, Marlboro, NJ (US); Tan Xu, Bridgewater, NJ (US); David Crawford Gibbon, Lincroft, NJ (US); Lee Begeja, Gillette, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 682 days.

(21) Appl. No.: 15/921,016

(22) Filed: Mar. 14, 2018

(65) Prior Publication Data
US 2019/0287415 A1  Sep. 19, 2019

(51) Int. Cl.
| | |
|---|---|
| *G06F 40/30* | (2020.01) |
| *G09B 5/08* | (2006.01) |
| *G09B 7/00* | (2006.01) |
| *G09B 5/06* | (2006.01) |
| *G10L 15/26* | (2006.01) |

(52) U.S. Cl.
CPC ............ *G06F 40/30* (2020.01); *G09B 5/065* (2013.01); *G09B 5/08* (2013.01); *G09B 7/00* (2013.01); *G10L 15/26* (2013.01)

(58) Field of Classification Search
CPC .. G09B 5/08; G09B 5/065; G09B 7/00; G06F 40/30; G06F 40/20; G10L 15/26
USPC ........................................................ 434/309
See application file for complete search history.

(56) References Cited

U.S. PATENT DOCUMENTS

| | | |
|---|---|---|
| 7,827,055 B1 | 11/2010 | Snodgrass et al. |
| 8,161,111 B2 | 4/2012 | Espelien |
| 9,438,647 B2 | 9/2016 | Gibbon et al. |
| 9,483,954 B2 | 11/2016 | York et al. |
| 9,836,438 B2 | 12/2017 | Sherkin |
| 9,892,203 B2 | 2/2018 | Houston et al. |
| 2003/0198935 A1 | 10/2003 | Wen et al. |
| 2012/0084657 A1 | 4/2012 | Ranade et al. |
| 2015/0033153 A1 | 1/2015 | Knysz et al. |
| 2015/0243178 A1 | 8/2015 | Tuyl |
| 2016/0117339 A1 | 4/2016 | Raskin et al. |

*Primary Examiner* — Robert P Bullington (57) ABSTRACT

Devices, computer-readable media, and methods for assembling a course for a subject are described. For example, a method may include a processing system having at least one processor identifying a plurality of content segments of a plurality of content sources of a subject having greater than a threshold similarity, and determining that a first topic is part of a core topic of the subject based upon a number of instances of the first topic within the plurality of the content segments. The processing system may then receive a request from a user device for a course for the subject, assemble the course for the subject including at least one of the plurality of the content segments having the first topic that is determined to be part of the core topic, and present the course to the user device.

20 Claims, 4 Drawing Sheets

CONTENT CURATION FOR COURSE GENERATION

The present disclosure relates generally to online educational content systems, and more particularly to methods, computer-readable media, and devices for assembling a course for a subject.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and device for assembling a course for a subject. For instance, in one example, a method may include a processing system having at least one processor identifying a plurality of content segments of a plurality of content sources of a subject having greater than a threshold similarity, and determining a first topic is part of a core topic of the subject based upon a number of instances of the first topic within the plurality of the content segments. The processing system may then receive a request from a user device for a course for the subject, assemble the course for the subject including at least one of the plurality of the content segments having the first topic that is determined to be the core topic, and present the course to the user device.

Examples of the present disclosure aggregate teaching/learning content (across different modalities including video, audio, text, slide presentations, etc.) to identify items of high importance, difficulty, and student (user) and/or instructor (content creator) interest. In particular, examples of the present disclosure identifying common content segments, formulate core topics, identify subjective content, and provide personalization of course trajectories to specific users.

In one example, identifying common content segments among educational or factual content sources in a subject area entails matching video segments, multimedia presentations, text, audio, etc. from various instructors or other providers of content sources. The content segments may be identified as being similar using keyword matching, image matching, explicit correspondence between the course titles, lecture titles, tagged topics, and so forth. Similar content segments are pooled for segment topic grouping. In one example, anomalies or subjective materials from an instructor are identified and grouped as "personal views" on a topic so that general curated content remains objective. In one example, content segments may be determined from various content sources by explicit chaptering, titling, pagination, and the like. In addition, in one example, continuous video or audio may be segregated into content segments (e.g., video or audio clips) by a shot/clip boundary detection algorithm.

In one example, subsets of video segments or other content types from different instructors may be determined to comprise "core curriculum" through video, audio, and/or textual matching algorithms. In particular, when a number or percentage of content segments from different instructors are quantified as being "similar," it is considered that the similar content segments cover a core topic of a subject or course. In one example, theme/topic detection techniques may then be applied to determine the core topic(s) contained in the similar content segments that have been matched/grouped. For instance, with respect to video or audio content segments the system can detect high frequencies or specific tonal suggestions by an instructor to indicate importance or uniqueness of a topic. Similarly, the system may look to word or phrase repetition, the use of a number of words and/or phrases associated with one or more topics, and so forth to determine the topic(s) present in the one or more content segments. Alternatively, or in addition, instructors or administrators may annotate specific areas of importance or annotate the topic(s) in a given content segment.

In addition, in one example, a number of questions may be extracted from video, recognized speech, or on-screen text, and so forth, and collected into automatically generated review material, e.g., a quiz or a test for self-guided learning. In one example, the questions may be provided in the review material along with links to corresponding content segments. For instance, a user may be stuck on a question and may wish to view the relevant content segment(s) of the original learning material as a reminder. In one example, the system records incorrect answers, length of time spent on answering questions, or link and discussion counts in an online forum. In one example, questions may be presented to a user in a given order, e.g., easier questions followed by more difficult questions, a certain percentage mixture of difficult, easy, or average questions, and so forth depending upon the user's previous knowledge of the subject, previous coursework, success or difficulty in answering previously presented questions, and so on.

In one example, the system may also monitor accessing of a content segment (e.g., viewing, downloading, etc.) to determine high confusion or critical review of a topic. For instance, a content segment that is re-accessed by the same user may indicate that the topic(s) of the content segment are important, difficult, confusing, or all of the above. In addition, when a plurality of users exhibit the same behavior of re-accessing and reviewing a content segment, the system may consider the topic(s) of the segment sufficiently difficult or confusing that the topic(s) should be included as a target learning objective, e.g., by frequency of presentation of review questions relating to the topic(s), by inclusion of a greater number or percentage of review questions relating to the topic(s) in the review material, by inclusion of links to the content segment(s) containing the topic in the review materials, and/or by preferential selection of a content segment containing the topic(s) in a course assembled for a user.

In one example, the system may identify bias or subjective content within content segments. For instance, the system may track anomalous video (e.g., a fight scene) or emotionally biased sentiment (e.g., speech tone, use of particularly charged words or phrases, etc.). To illustrate, there may be ten different content sources from ten different instructors relating to a teaching subject, but only one may go into detail regarding a particular topic. For example, the system may detect content that does not match content provided via any of the other instructors, such as a video segment that does not share or overlap in keywords, which may reveal the instructor's bias or personal preference for the particular topic. Similarly, the system may detect an unusual tone within a first content segment containing a particular topic, a use of words or phrases that is/are unique as compared to "similar" content segments from other instructors containing the same topic, and so on. In one example, such a content segment may be excluded from consideration in assembling a course, may be de-weighted in considering which content segments to include in a course, or may be provided to one or more students with information regarding the potential bias that is detected. In addition, in one example, feedback may be provided to the instructor, to an administrator, etc. regarding the detection of potential bias or personal views.

In one example, a student can search the system for topics and existing content. Within a community, peer students can highly rate one or more instructors, giving their content more importance. Similarly, feedback from students can be utilized to rate one or more content segments or instructors overall. In one example, the system may maintain and update rankings of content segments from different instructors, track the number of watches, reviews, and/or likes to select curated segments, and to create a course comprising a curated set of topics for the student to consume, along with test/review material to validate learning. In addition, in one example, the system may modify course material based on student viewing history and background. For instance, a student may skip a part of a new course if the system tracks that the user has seen the same or similar test material or viewed the same or similar content. These and other aspects of the present disclosure are described in greater detail below in connection with the examples of FIGS. 1-4.

Figure 1:
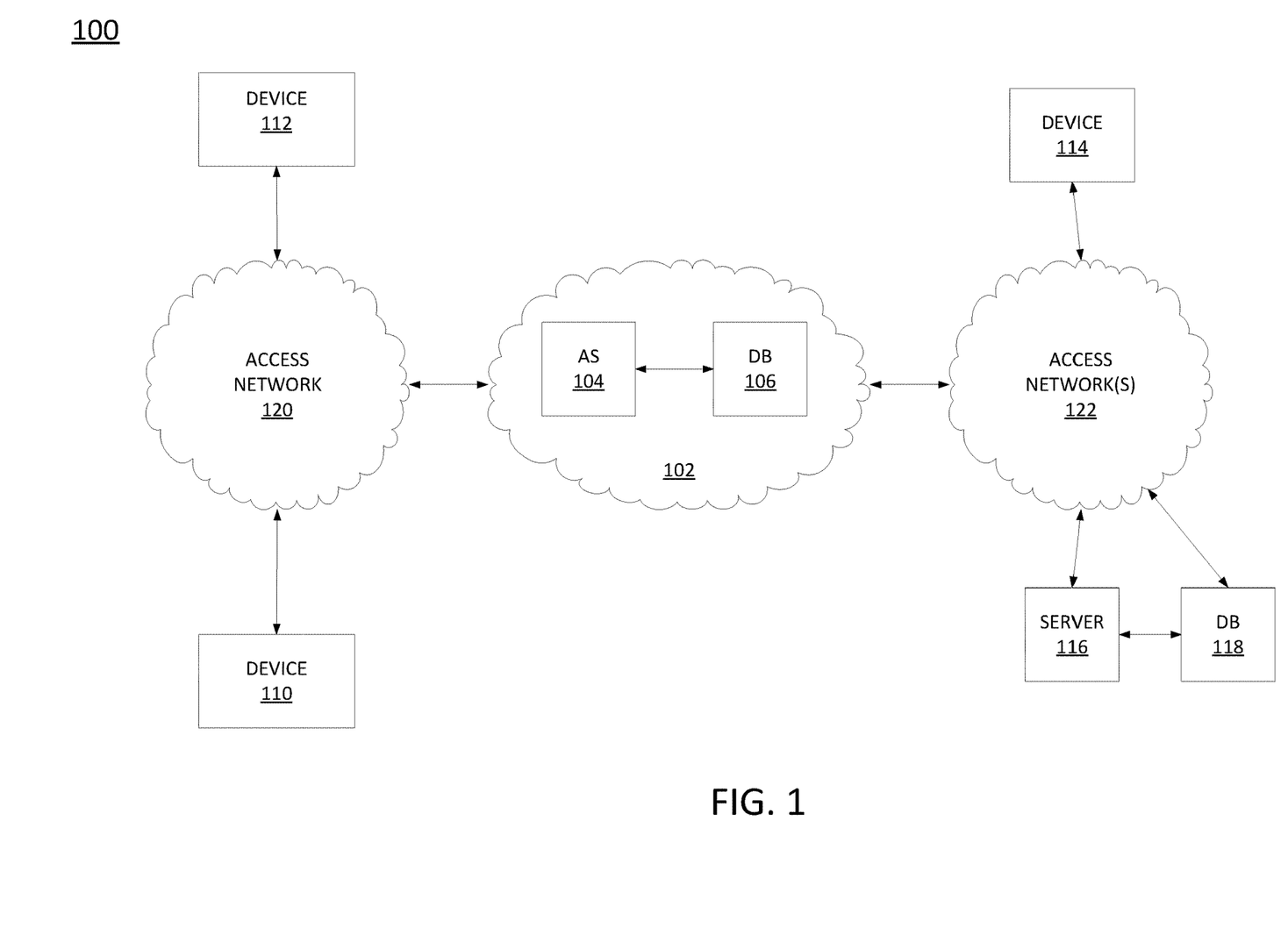
FIG. 1 illustrates an example network related to the present disclosure.

To further aid in understanding the present disclosure, FIG. 1 illustrates an example system 100 in which examples of the present disclosure for assembling an educational course for a subject may operate. The system 100 may include any one or more types of communication networks, such as a traditional circuit switched network (e.g., a public switched telephone network (PSTN)) or a packet network such as an internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses internet Protocol to exchange data packets. Additional example IP networks include Voice over IP (VoIP) networks, Service over IP (SoIP) networks, and the like.

In one example, the system 100 may comprise a core network 102. The core network 102 may be in communication with one or more access networks 120 and 122, and the Internet (not shown). In one example, core network 102 may combine core network components of a cellular network with components of a triple play service network; where triple-play services include telephone services, internet services and television services to subscribers. For example, core network 110 may functionally comprise a fixed mobile convergence (FMC) network, e.g., an IP Multimedia Subsystem (IMS) network. In addition, core network 102 may functionally comprise a telephony network, e.g., an internet Protocol/Multi-Protocol Label Switching (IP/MPLS) backbone network utilizing Session Initiation Protocol (SIP) for circuit-switched and Voice over internet Protocol (VoIP) telephony services. Core network 110 may further comprise a broadcast television network, e.g., a traditional cable provider network or an internet Protocol Television (IPTV) network, as well as an internet Service Provider (ISP) network. In one example, core network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of core network 102 may provide a cable television service, an IPTV service, or any other type of telecommunication service to subscribers via access networks 120 and 122. In one example, the access networks 120 and 122 may comprise different types of access networks, may comprise the same type of access network, or some access networks may be the same type of access network and other may be different types of access networks. In embodiment, the core network 102 may be operated by a telecommunication network service provider. The core network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110 and 112. Similarly, access networks 122 may be in communication with one or more devices, e.g., device 114. Access networks 120 and 122 may transmit and receive communications between devices 110, 112, and 114, between devices 110, 112, and 114, and server 116 and/or database (DB) 118, application server 104 and/or database (DB) 106, other components of core network 102, devices reachable via the internet in general, and so forth. In one example, each of devices 110, 112, and 114 may comprise any single device or combination of devices that may comprise a user endpoint device. For example, the devices 110, 112, and 114 may each comprise a mobile device, a cellular smart phone, a laptop, a tablet computer, a desktop computer, an application server, a bank or cluster of such devices, and the like. In one example, devices 110, 112, and 114 may each comprise programs, logic or instructions for performing functions in connection with examples of the present disclosure for assembling a course for a subject. For example, devices 110, 112, and 114 may each comprise a computing system or device, such as computing system 400 depicted in FIG. 4, and may be configured to provide one or more operations or functions in connection with examples of the present disclosure for assembling a course for a subject, as described herein.

Figure 4:
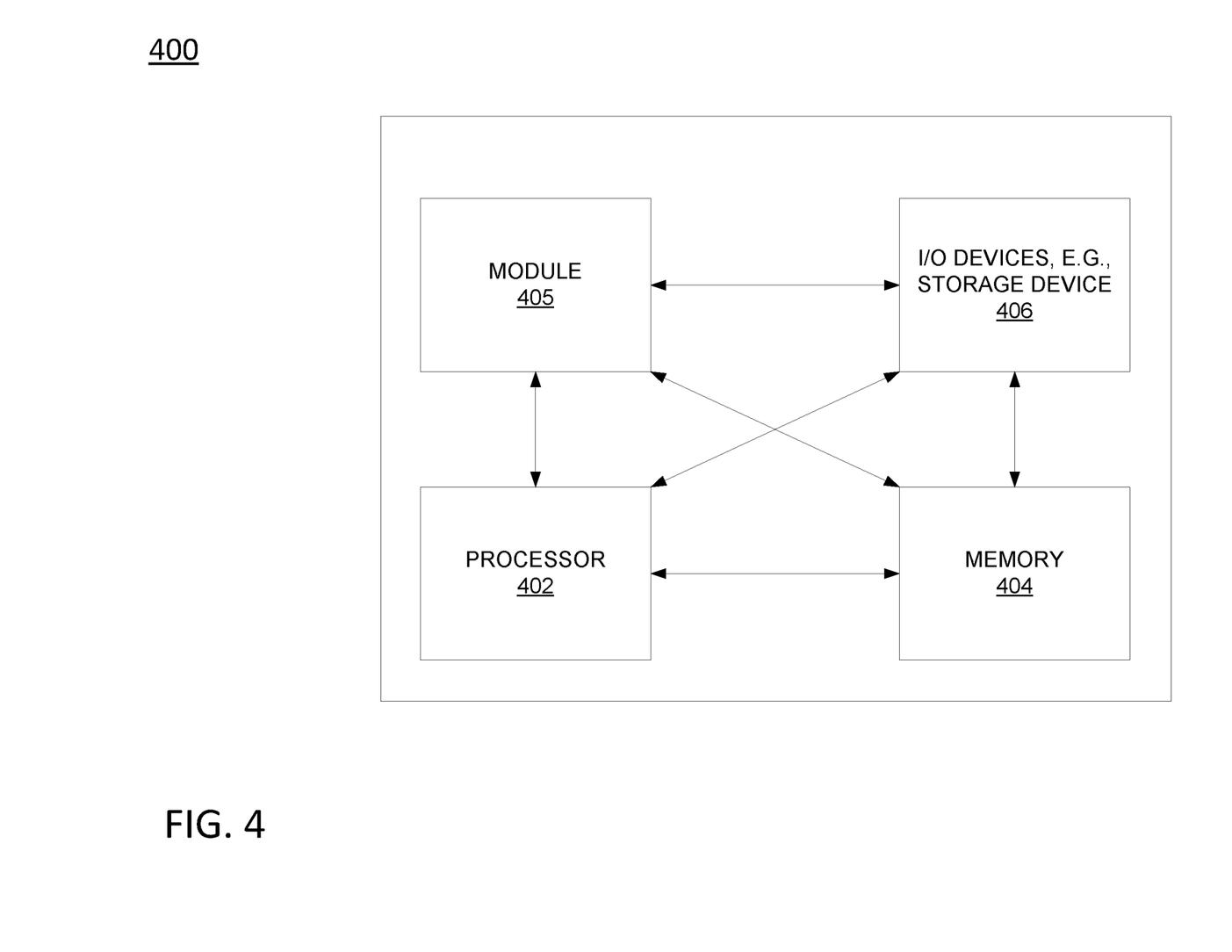
FIG. 4 illustrates a high level block diagram of a computing device specifically programmed to perform the steps, functions, blocks and/or operations described herein.

In one example, the access networks 122 may also be in communication with a server 116 and a database (DB) 118. The server 116 and DB 118 may be associated with, for example, a school, a college or university, or other educational content providers. In accordance with the present disclosure, server 116 may comprise a computing system or server, such as computing system 400 depicted in FIG. 4, and may be configured to provide one or more operations or functions for assembling an educational course for a subject, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, DB 118 may comprise a physical storage device integrated with server 116 (e.g., a database server), or attached or coupled to the server 116, to store various types of information in support of systems for assembling a course for a subject, in accordance with the present disclosure. For example, DB 118 may store content sources, content segments, users' course histories, records of users' responses to quiz, test, and/or review questions, comments or discussion tags for content segments, questions, and so forth that may be processed by server 116 or provided to devices requesting educational courses from server 116.

To illustrate, application server 116 may identify a plurality of content segments of a plurality of content sources of a subject having greater than a threshold similarity, determine a first topic is part of a core topic of the subject based upon a number of instances of the first topic within the plurality of the content segments, receive a request from a user device for a course for the subject, assemble the course for the subject including at least one of the plurality of the content segments having the first topic that is determined to be the core topic, present the course to the user device, and so forth. In one example, server 116 may obtain the content sources and/or content segments from DB 118. In one example, the content sources may be received by DB 118 from one or more devices of one or more instructors who have created various educational content, such as device 114. In one example, the request may be received from a user device comprising one of the device 110 or device 112, and the course may be provided to such a user device after server 116 assembles the course. The request may be received via access networks 120, access networks 122, core network 102, and/or Internet in general, and the course may be provided via any one or more of the same networks. For example, the course may be downloaded to a user device in its entirety, or may be streamed via the one or more networks. These and other aspects of the present disclosure are discussed in greater detail below in connection with the examples of FIGS. 2 and 3.

Although only a single server 116 and a single DB 118 are illustrated, it should be noted that any number of servers 116 or databases 118 may be deployed. In one example, core network 102 may also include an application server (AS) 104 and a database (DB) 106. In one example, AS 104 may perform the same or similar functions as server 116. Similarly, DB 106 may store the same or similar information as DB 118, e.g., various content sources such as video programs, audio programs, slide presentations, text documents, interactive text materials, multimedia presentations, and the like, programs, logic, or instructions that may be executed by server 116 for assembling a course for a subject in accordance with the present disclosure, and so forth. For instance, core network 102 may provide courses for subjects to subscribers, e.g., in addition to television, phone, and/or other telecommunication services. In one example, AS 104, DB 106, server 116, and/or DB 118 may operate in a distributed and/or coordinated manner to perform various steps, functions, and/or operations described herein.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of core network 102, access networks 120 and 122, and/or Internet may comprise a content distribution network (CDN) having ingest servers, edge servers, and the like for packet-based streaming of video, audio, or other content that may be provided in course materials assembled in accordance with the present disclosure. Similarly, although only two access networks, 120 and 122 are shown, in other examples, access networks 120 and/or 122 may each comprise a plurality of different access networks that may interface with core network 102 independently or in a chained manner. For example, device 114 and server 116 may access core network 102 via different access networks, devices 110 and 112 may access core network 102 via different access networks, and so forth. Thus, these and other modifications are all contemplated within the scope of the present disclosure.

Figure 2:
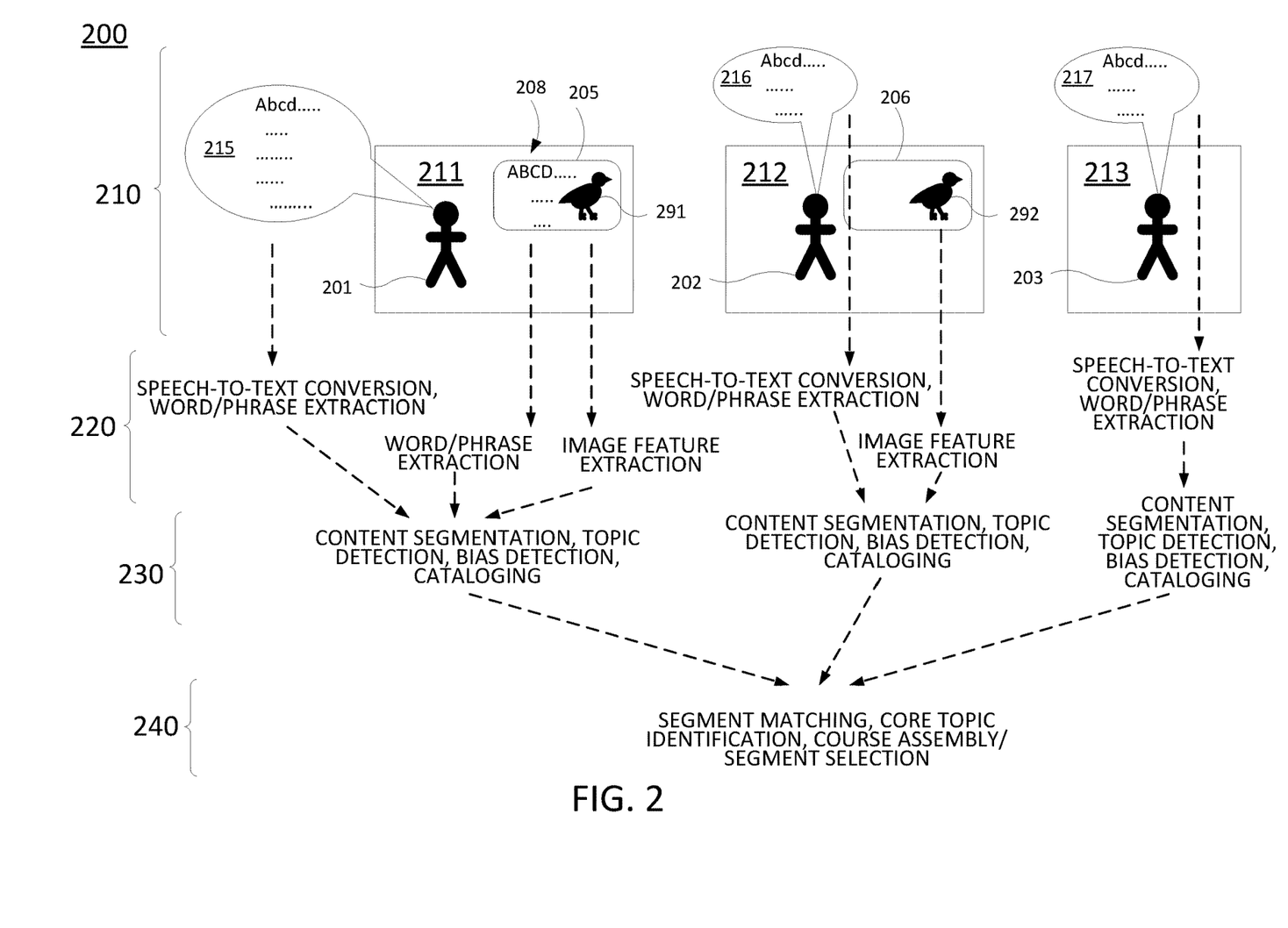
FIG. 2 illustrates an example process in accordance with the present disclosure.

FIG. 2 illustrates an example process 200 in accordance with examples of the present disclosure for assembling an educational course for a subject. As illustrated in FIG. 2, the process 200 may begin at stage 210 with a number of content sources which may comprise video programs, audio programs, slide presentations, text documents, interactive text materials, multimedia presentations, and the like. In the present example, there may be three content sources 211, 212, and 213. Content source 211 may include, for example, a slide presentation 205 and an audio portion 215, e.g., speech of instructor 201. Slide presentation 205 may include text 208 as well as image(s) 291, e.g., including a bird. It should be noted that slide presentation 205 may include a number of slides which may be displayed at various times with respect to the audio portion 215. However for illustrative purposes, slide presentation 205 is shown in FIG. 2 at one particular moment. Similarly, content source 212 may include a video 206 with image(s) 292, e.g., including a bird, and an audio portion 216, e.g., speech of instructor 202. In addition, content source 213 may include only an audio portion 217, e.g., speech of instructor 203.

At stage 220, the process 200 may perform various front-end operations. For instance, stage 220 may include speech-to-text conversion, e.g., for audio portions 215, 216, and 217, as well as word/phrase extraction of the converted text. Stage 220 may also include word/phrase extraction, e.g., from text 208 of slide presentation 205. In addition, stage 220 may include image feature extraction, e.g., for images in slide presentation 205 and video 206. The specific operations of stage 220 may vary depending upon the capabilities of the device(s) performing the process 200, the types of content sources that are made available, and so forth. For instance, in another example where video 206 may include an audio track, stage 220 may include extracting audio features which may be used to distinguish a bird call, a train whistle, a crashing wave, a type of music or a particular composition, and so forth. In still another example, a content source may comprise a video of a lecture where the instructor is using a chalkboard, a dry-erase board, a smart board, or the like. In such an example, stage 220 may include optical character recognition (OCR) image processing to extract text from the instructor's writings and word/phrase extraction from the detected text.

At stage 230, the process 200 may include content segmentation, theme detection, bias detection, and cataloging of content sources and/or content segments. In one example, content segmentation may utilize metadata of the content sources 211-213. For example, explicit chaptering of lessons may be used to indicate the boundaries between content segments of a content source. Similarly, the use of different slide decks in conjunction with an audio lecture may be used to indicate different content segments.

Alternatively, or in addition, shot and scene detection algorithms may locate and tag shot and/or scene boundaries in a video program, such as video 206. For instance, a shot detection program may utilize color histogram differences or a change in color distribution, edge change ratios, standard deviation of pixel intensities, contrast, average brightness, and the like to identify hard cuts, fades, dissolves, etc., which may indicate the end of a shot and the beginning of another shot. In one example, a scene detection program that may be deployed in accordance with the present disclosure may utilize audio and/or text caption data to relate shots together into a scene. In addition, shot and scene detection programs implemented in examples of the present disclosure may also detect shot and scene boundaries utilizing any topics that are identified as defining features of the respective shots and/or scenes. It should be noted that in some cases, a scene may be comprised of a single shot or a plurality of shots. In one example, a shot is broadly interpreted as a sequence of one or more frames of images shot by a camera. In one example, multiple techniques may be used in aggregate to delineate content segments within a content source.

In one example, a topic may comprise a "concept" from a lexical database. For example, the Large Scale Theme Ontology for Multimedia (LSCOM) has hundreds of "themes," such as: "parade," "exiting car," "handshaking," "running," "rocket launching," "barn," "college," "castle," "conference room," "emergency room," "bathroom," "interview on location," "text on artificial background," "ship," "shipyard," "birds," "face," "bicycle," and so on. Other examples include LSCOM-Lite, which has 39 themes, National Institute of Standards and Technology (NIST) Text REtrieval Conference (TREC) Video Retrieval Evaluation (TRECVID) 2016 lexical themes, and the like. In one example, the present disclosure may utilize a lexicon that is specific to a subject area to determine various topics present in content sources. For instance, a first lexicon may be used for film related courses, a second lexicon may be used for university level math content sources, a third lexicon may be utilized for primary school level math content sources, a fourth lexicon may be used for secondary school level natural science content sources, a fifth lexicon may be used for automotive-related professional training content sources, and so forth. Thus, the present disclosure may function with any lexicon that is presently available or that is later developed.

In one example, the lexicon(s) may include topic models (e.g., classifiers) for a number of topics which may be applied to content sources and/or content segments to identify topics in the content sources and/or content segments, and to tag the content sources and/or content segments with the topics that are identified. For instance, topics may be identified after content segmentation, or may be applied to the content sources overall, where topics that are identified may be further used in the content segmentation.

Notably, classifiers can be trained from any text, video, image, audio and/or other type of content to recognize various topics, which may include objects like "car," scenes like "outdoor," and actions or events like "baseball." Topic identification classifiers may include support vector machine (SVM) based or non-SVM based classifiers, such as neural network based classifiers. The classifiers may be trained upon and utilize various data points to recognize topics in scenes. For instance, classifiers may use low-level invariant image data, such as colors, shapes, color moments, color histograms, edge distribution histograms, etc., may utilize speech recognition pre-processing to obtain an audio transcript and to rely upon various keywords or phrases as data points, may utilize text recognition pre-processing to identify keywords or phrases in captioned text as data points, may utilize image salience to determine whether detected objects are "primary" objects of a scene or are less important or background objects, and so forth. In one example, stage 230 may further include tagging content segments with the topic(s) that is/are determined and storing the content segments, e.g., in a database.

Stage 240 may include identifying core topics and the selection of content segments for course assembly. In one example, stage 240 may include clustering of similar content segments. The clustering may be based upon correspondence or similarities of the topic(s) that are determined. In one example, metadata of content segments may be used to determine that content segments are "similar." For instance, there may be two lectures having a same title, there may be two lecture videos which are tagged as being related to the same lesson in a textbook, and so forth. In one example, the clustering may comprise unsupervised clustering that utilizes various pieces of information regarding a content segment that are available, such as titles, topics that are determined at stage 230, image features, and so forth. The clustering may also comprise hard clustering (e.g., each content segment belongs to a single cluster) or soft clustering (e.g., each content segment may belong to one or more clusters).

In one example, the number of clusters may be defined in advance. For instance, university level math courses may follow a 20-40 semester hour format, typically involving a 45 minute-1.5 hour lecture. In this case, there may be a maximum of 40 clusters, 50 clusters, etc. to loosely follow a segregation of course material into lectures having specific topics. In another example, there may be a maximum number of clusters based upon a preferred content segment length (e.g., for audio and/or video lectures). For instance, lectures may be broken down into approximately 10 minute content segments. To illustrate, a one hour lecture may have six content segments, while an entire 30 hour semester may include 180 content segments. It should be noted that the content segments may not be entirely uniform in length and may have lengths based upon the shot/scene detection algorithm(s) described above. However, in one example, these algorithms may be weighted to favor dividing content sources into content segments that are close to 10 minutes in length, 15 minutes in length, etc. while simultaneously maintaining the cohesiveness of the topic(s) within each content segment. In such case, the number of clusters may be set to 50, 100, 150, or some other number of clusters. In still another example, the number of clusters may not be fixed, but may be based upon a threshold of similarity metrics, where the resulting number of clusters depends upon the number of content segments, the measured similarities, and/or other factors not known in advance.

In addition, in one example at stage 240, a core topic or core topics for a course may be identified. In one example, the core topic(s) may comprise one or more topics that are contained with content segments in a given cluster of content segments having a greatest frequency of occurrence. For instance, at step 240, content segments from each of content sources 211, 212, and 213 may be determined to be similar, and hence may be grouped into a cluster. In addition, within the content segments, the topic of "transmissions" may appear two times, the topic of "engine cylinders" may appear eight times, the topic of "spark plugs" may appear seven times, and so forth. As described above, the topics may be directly or indirectly indicated in a content segment through metadata tagging (e.g., by an instructor or administrator), may be derived from text or speech that is converted to text, derived from image identification, and so on. Continuing with the present example, "engine cylinders" may be identified as a core topic, since it appears the greatest number of times. In one example, "spark plugs" may also be identified as a core topic, e.g., where a threshold for identifying core topics may be set to four occurrences within a cluster of content segments, five occurrences within a cluster of content segments, etc.

Stage 240 may also include receiving a request for a course from a user device and assembling a course comprised of various content segments. In one example, the request for the course may include a maximum course time and a requested format. For instance, the user may want an audio only course, a course comprised of video lectures, a course with multimedia presentations, slides, and/or documents, and so forth. In one example, the user may indicate a preference for a 20-30 hour semester length course. In another example, the user may indicate a preference for a four hour course. In each case, stage 240 may then assemble the available content segments into a course tailored to the user and his or her specific requests. For example, the assembly of the course at stage 240 may account for the user's educational history in addition to the requested duration and course format(s). To illustrate, a core topic for an automotive course may be "spark plugs." However, the user may already have consumed course material (e.g., one or more content segments) relating to spark plugs. Thus, a content segment for "spark plugs" may be omitted from selection at stage 240. However, content segments for other core topics may be selected and assembled into the course.

In one example, if the user indicates a desired course length of one hour and content segments are around 10 minutes in length (e.g., for video and/or audio content), stage 240 may comprise selecting approximately six content segments, e.g., one for each of six core topics. In one example, the core topics (and hence content segments) that are selected may be based upon a ranking of core topics. For instance, core topics may be ranked in order based upon a number of occurrences of the core topic(s) within each of the clusters. Then, a content segment from each of the clusters associated with the top "n" core topic(s) may be selected and assembled into the course. In one example, the order of presentation of the content segments may be in the order of ranking. In another example, the content segments that are selected for inclusion in the course may then be evaluated for order of arrangement as follows. Each of the content segments may be considered in the order that the content segments occurred within each of the original content sources. This may comprise a numerical position, a percent based upon a start time within an overall length of the original content source, and so forth. Thereafter, the content segments may be arranged in the order of occurrences.

Alternatively, or in addition, content segments may be presented to the user in a list of suggested order with the titles and other information relating to each content segment, e.g., the core topic(s), other topics identified in the content segment(s), and so forth. The user may then select which content segments to watch, listen, view, etc., and in which order. This may be beneficial where content segments may have different formats and the best order to consume the content segments may not be clear. For instance, there may be a video lecture content segment from a first content source and a slide presentation from a second content source which may be partially overlapping in the underlying subject matter and it may be useful to view the slides and listen to the lecture at the same time, even if these content segments were from different original content sources. These and other aspects of the present disclosure are further discussed below in connection with the example method 300 of FIG. 3.

Figure 3:
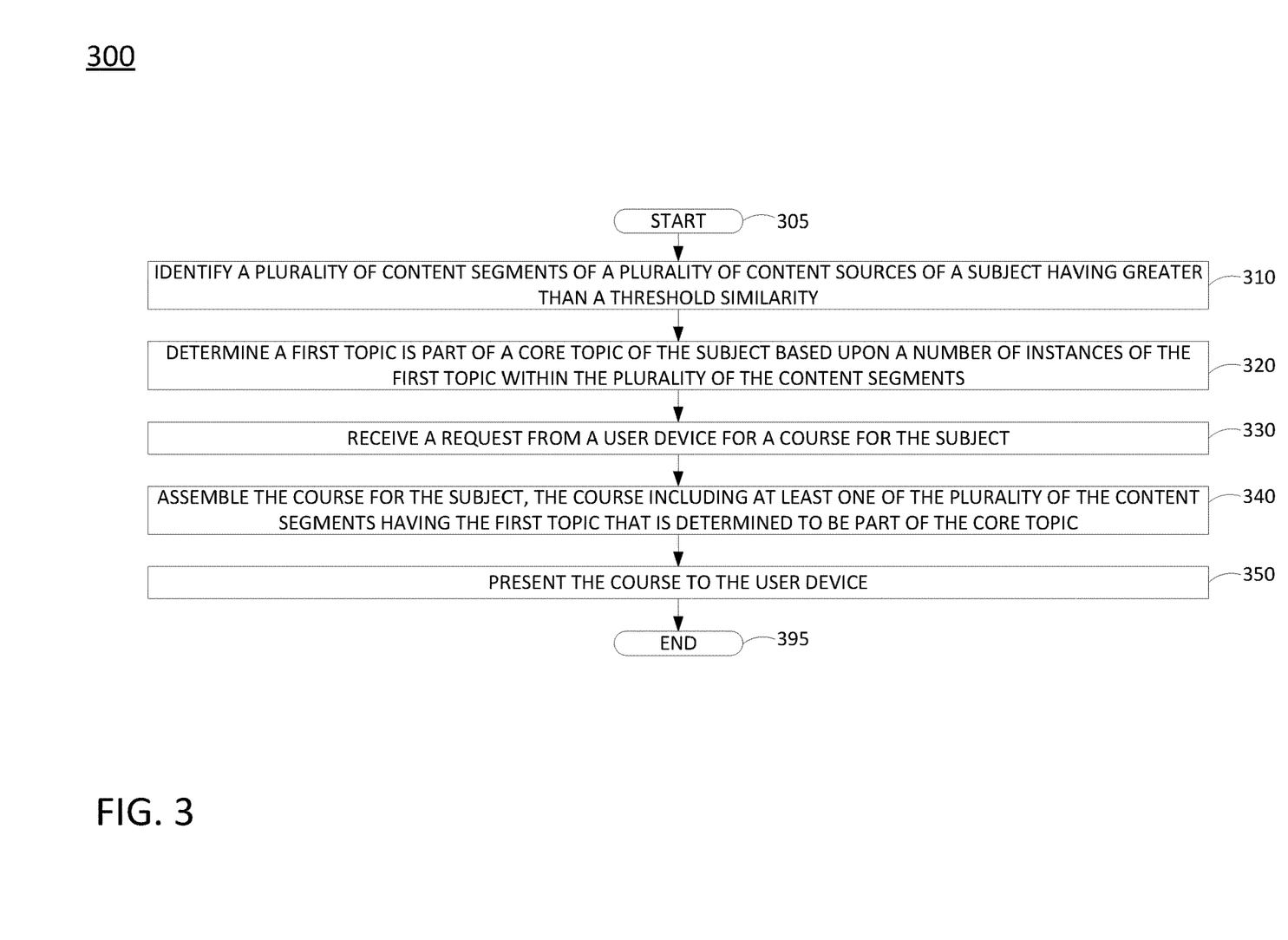
FIG. 3 illustrates a flowchart of an example method for assembling a course for a subject.

FIG. 3 illustrates a flowchart of an example method 300 for assembling a course for a subject, in accordance with the present disclosure. In one example, the method 300 is performed by a component of the system 100 of FIG. 1, such as by one of the server 116, application server 104, and/or any one or more components thereof (e.g., a processor, or processors, performing operations stored in and loaded from a memory), or by one of the server 116 or application server 104, in conjunction with one or more other devices, such as DB 106, DB 118, device 114, and so forth. In one example, the steps, functions, or operations of method 300 may be performed by a computing device or system 400, and/or processor 402 as described in connection with FIG. 4 below. For instance, the computing device or system 400 may represent any one or more components of a server 116 and/or application server 104 in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processor, such as processor 402. The method 300 begins in step 305 and proceeds to step 310.

At step 310, the processor identifies a plurality of content segments of a plurality of content sources of a subject having greater than a threshold similarity. In one example, the plurality of content sources may include video content sources, audio content sources, image content sources, text content sources, and so on, or any combination of such content sources. Step 310 may include extracting audio features and/or performing speech-to-text conversion, e.g., for audio content sources, as well as word/phrase extraction of the converted text, extracting words/phrases, e.g., from text documents, slide presentations, or the like, extracting image features and/or performing optical character recognition, e.g., for images in slide presentations, videos, or the like, and so forth. In one example, step 310 may include content segmenting utilizing metadata of the content sources, shot and scene detection algorithms to locate and tag shot and/or scene boundaries in a video program, and so forth.

For image content sources or video content sources, step 310 may include at least one of matching image patterns among images of the plurality of content segments or matching metadata tag information among the images of the plurality of content segments. For example, step 310 may include clustering of similar content segments. The clustering may be based upon correspondence or similarities of the features of the content segments. The features may include metadata of content segments, e.g., titles, tagged topics, and so forth, as well as topics that may be determined, image features, audio features, and so forth. The clustering may comprise hard clustering or soft clustering. Thus, in one example, the threshold similarity of the plurality of content segments may be defined in advance, may be based upon a target number of content segments per cluster, may be based upon a resulting number of clusters, and so forth. The threshold may comprise, for example, a distance within an n-dimensional feature space comprising the universe of "n" features which are taken into account in determining the similarity.

At step 320, the processor determines a first topic is part of a core topic of the subject based upon a number of instances of the first topic within the plurality of the content segments. In one example, at least two of the plurality of the content segments having the first topic may be from a same one of the plurality of content sources. In one example, at least two of the plurality of the content segments having the first topic may be from different ones of the plurality of content sources. In one example, the number of instances of the first topic is determined in accordance with: identifying an image associated with the first topic within the plurality of content segments or identifying a word or a phrase associated with the first topic within the plurality of content segments, e.g., where the word or the phrase is associated with the first topic in a database. In one example, the first topic is identified within a content segment of a text content source or an audio content source based upon a word frequency or a phrase frequency, e.g., where the word or the phrase is associated with the first topic in a database. When the content segment is from an audio content source or video content source, step 320 may include performing a speech-to-text conversion of the content segment. Similarly, when the content segment is from a video, slide, or multimedia content source, step 320 may include extracting an image from the content segment and identifying the image in accordance with an image database. In one example, the first topic may be determined to be a core topic when the first topic has a greatest frequency of occurrence within the plurality of content segments identified at step 310 (e.g., as compared to other topics that may also be present within the plurality of content segments).

In one example, step 320 may include determining a plurality of topics for the subject. For instance, there may be multiple topics within the plurality of content segments identified at step 310. In addition, there may be multiple pluralities of content segments that are similar (e.g., multiple groupings/clusters), and multiple topics within content segments of each of the groupings. In addition, in one example, step 320 may include determining a plurality of core topics for the subject. For instance, a core topic may be determined for each cluster/grouping, where the plurality of core topics may be determined to include all or a portion of the core topics that are determined for each of the respective clusters/groupings. In addition, in one example, for each cluster/grouping of content segments, the processor may select as core topics the top two topics, the top three topics, the top five topics, and so forth.

At step 330, the processor receives a request from a user device for a course for the subject. The request may include, for example, an identification of the subject, a desired course length, a desired course format (or formats), and so forth. In one example, the request may also include an educational history of the user, e.g., courses already completed, passed quizzes and tests for relevant subject matter, and so forth.

At step 340, the processor assembles the course for the subject, where the course including at least one of the plurality of the content segments having the first topic that is determined to be the core topic. For instance, the processor may select core topics (and hence content segments) for inclusion in the course based upon a ranking of core topics. In one example, core topics may be ranked in order based upon a number of occurrences of the core topic(s) within each of the clusters. Then, a content segment from each of the clusters associated with the top "n" core topic(s) may be selected and assembled into the course. In one example, the processor may select one of the plurality of content segments having the core topic for inclusion in the review material based upon the one of the plurality of content segments having a highest ranking (e.g., a greatest number of occurrences of the first topic comprising the core topic). In another example, the processor may select a most viewed or highest ranked content segment from the plurality of content segments (e.g., as rated by users, administrators, peer instructors, any combination thereof, and so on). In one example, the order of presentation of the content segments may be in an order of rankings. In another example, the content segments that are selected for inclusion in the course may then be evaluated for order of arrangement as follows. Each of the content segments may be considered in the order that the content segments occurred within each of the original content sources. This may comprise a numerical position, a percent based upon a start time within an overall length of the original content source, and so forth.

In one example, step 340 may include determining that a user associated with the user device has knowledge relating to at least one of a plurality of core topics of the subject and selecting content segments relating to other core topics of the subject, i.e., excluding content segments relating to the core topic for which the user has already studied. In one example, the user is determined to have knowledge relating to the core topics based upon a record of the user having accessed at least one content segment having the core topic or based upon a record of the user having passed at least one test relating to the core topic.

In one example, step 340 may further include generating review material for the subject matter and including the review material in the course. In one example, the processor may select one of a plurality of content segments having the core topic for inclusion in the review material based upon the one of the plurality of content segments having a highest ranking. The ranking may be based upon a number of accesses of the one of the plurality of content segments, an average user rating of the one of the plurality of content segments, a combination of such factors or other factors, and so forth.

In one example, step 340 may include determining that a second topic within the plurality of content segments is a confusing topic based upon a number of repeated accesses of at least one of the plurality of content segments having the second topic, e.g., by an individual user, or by multiple individual users. In such an example, the processor may include at least one of the content segments having the second topic in the review material at step 340. Alternatively, or in addition, the processor may extract a question and an answer to the question from a content segment having the second topic, and include the question and the answer in the review material.

In one example, step 340 may also include assessing the plurality of content segments for potential instructor bias in accordance with a set of words or phrases that may be indicative of the potential instructor bias. The processor may also perform at least one remedial action in response to the assessing the potential instructor bias (i.e., when bias is detected) for at least one of the plurality of content segments. For instance, the at least one remedial action may comprise excluding the at least one of the plurality of content segments from the course for the subject when the at least one of the plurality of content segments is assessed to contain the potential instructor bias. Alternatively, or in addition, the at least one remedial action may comprise providing a notification to the user device of the potential instructor bias for the at least one of the plurality of content segments when the at least one of the plurality of content segments is assessed to contain the potential instructor bias.

At step 350, the processor presents the assembled course to the user device. For instance, the course may be transmitted to the user device in a format requested at step 330, such as a bulk download, network-based streaming, etc. In one example, the processor may also record that the course has been provided to the user device, along with information pertaining to the content segments and the core topic(s) of the content segments. Thus, for example, the processor may exclude content segments regarding certain topics in subsequent requests from the same user (or user device) for the same or a similar course. In one example, step 350 may comprise presenting the content segments of the course to the user device in an order determined at step 340. Alternatively, or in addition, content segments may be presented to the user device in a list of suggested order with the titles and other information relating to each content segment, e.g., the core topic(s), other topics identified in the content segment(s), and so forth. The user may then select which content segments to watch, listen, view, etc., and in which order. In one example, the course may provide the user device with links to the content segments, which the user device may then retrieve from other network-based sources. Following step 350, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 by receiving additional content sources, determining content segments from the additional content sources, identifying similar content segments, determining core topic(s), and so on. In another example, the method 300 may be expanded to include storing a course for a user. For instance, the user may request the creation of a course, but may only be able to watch or view a portion of the course in a first session. Thus, the processor may store (e.g., at the user device and/or in a network-based data storage device) the course for later consumption. In one example, the assembled course can also be sent to a senior instructor for review prior to forwarding the assembled course to the requesting user, thereby ensuring the assembled course will meet a certain level of completeness or educational competence. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for assembling a course for a subject, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for assembling a course for a subject (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for assembling a course for a subject (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    identifying, by a processing system including at least one processor, a plurality of content segments of a plurality of content sources of a subject having greater than a threshold similarity, wherein the plurality of content segments comprises a plurality of video segments, wherein the plurality of content segments is determined to have greater than the threshold similarity based upon a plurality of matching features, wherein the plurality of matching features includes at least one matching topic of the plurality of content segments, wherein for the plurality of video segments, the at least one matching topic is determined in each of the plurality of video segments via at least one support vector machine comprising at least one topic identification classifier that is trained to recognize at least one topic in accordance with audiovisual features of the each of the plurality of video segments;
    determining, by the processing system, a first topic is part of a core topic of the subject based upon a number of instances of the first topic within the plurality of the content segments;
    receiving, by the processing system, a request from a user device for a course for the subject;
    assembling, by the processing system, the course for the subject, the course including at least one of the plurality of the content segments having the first topic that is determined to be part of the core topic; and
    presenting, by the processing system, the course to the user device.

2. The method of claim 1, wherein the determining that the first topic is part of the core topic of the subject further comprises:
    determining a plurality of core topics for the subject, wherein the plurality of core topics includes the core topic.

3. The method of claim 2, wherein the assembling the course for the subject comprises:
    determining that a user associated with the user device has knowledge relating to at least one of the plurality of core topics; and
    selecting additional content segments relating to at least one other core topic of the plurality of core topics that is different from the at least one of the plurality of core topics for the course.

4. The method of claim 1, wherein the number of instances of the first topic is determined in accordance with:
    identifying an image associated with the first topic within the plurality of content segments; or
    identifying a word or a phrase associated with the first topic within the plurality of content segments.

5. The method of claim 1, wherein at least two of the plurality of the content segments having the first topic are from a same one of the plurality of content sources or from different ones of the plurality of content sources.

6. The method of claim 1, wherein the assembling the course for the subject comprises:
    generating review material for the subject; and
    including the review material in the course.

7. The method of claim 6, wherein the generating the review material comprises:
    extracting a question and an answer to the question from the at least one of the content segments having the first topic; and
    including the question and the answer in the review material.

8. The method of claim 6, wherein the generating the review material comprises:
    selecting one of the plurality of content segments having the core topic for inclusion in the review material based upon the one of the plurality of content segments having a highest ranking of content segments of the plurality of content segments having the core topic.

9. The method of claim 8, wherein the highest ranking is based upon at least one of:
    a number of accesses of the one of the plurality of content segments; or
    an average user rating of the one of the plurality of content segments.

10. The method of claim 6, wherein the generating the review material comprises:

determining that a second topic within the plurality of content segments is a confusing topic based upon a number of repeated accesses by different users of at least one of the plurality of content segments having the second topic.

11. The method of claim 10, wherein the generating the review material further comprises:
including the at least one of the content segments having the second topic in the review material.

12. The method of claim 10, wherein the generating the review material further comprises:
extracting a question and an answer to the question from the at least one of the content segments having the second topic; and
including the question and the answer in the review material.

13. The method of claim 1, wherein the plurality of content sources comprises at least one of:
at least one video content source;
at least one audio content source;
at least one image content source; or
at least one text content source.

14. The method of claim 13, wherein the determining that the first topic is part of the core topic of the subject further comprises:
determining a plurality of topics for the subject, wherein the determining the plurality of topics comprises identifying the first topic within a content segment from the at least one text content source or the at least one audio content source based upon a word frequency or a phrase frequency.

15. The method of claim 14, wherein when the content segment is from the at least one audio content source, the determining the plurality of topics for the subject comprises:
performing a speech-to-text conversion of the content segment.

16. The method of claim 13, wherein the determining that the first topic is part of the core topic of the subject further comprises:
determining a plurality of topics for the subject, wherein the determining the plurality of topics comprises:
extracting an image from a content segment from the at least one image content source or the at least one video content source; and
identifying the image in accordance with an image database.

17. The method of claim 13, wherein the identifying the plurality of content segments of the plurality of content sources of the subject having greater than the threshold similarity comprises, for content segments of the at least one image content source or the at least one video content source, at least one of:
matching image patterns among images of the plurality of content segments; or
matching metadata tag information among the images of the plurality of content segments.

18. The method of claim 1, wherein the assembling the course for the subject comprises:
assessing the plurality of content segments for potential instructor bias in accordance with a set of words or phrases indicative of the potential instructor bias; and
performing at least one remedial action in response to the assessing the potential instructor bias for at least one of the plurality of content segments, wherein the at least one remedial action comprises at least one of:
excluding the at least one of the plurality of content segments from the course for the subject when the at least one of the plurality of content segments is assessed to contain the potential instructor bias; or
providing a notification to the user device of the potential instructor bias for the at least one of the plurality of content segments when the at least one of the plurality of content segments is assessed to contain the potential instructor bias.

19. A non-transitory computer-readable medium storing instructions which, when executed by a processing system including at least one processor, cause the processing system to perform operations, the operations comprising:
identifying a plurality of content segments of a plurality of content sources of a subject having greater than a threshold similarity, wherein the plurality of content segments comprises a plurality of video segments, wherein the plurality of content segments is determined to have greater than the threshold similarity based upon a plurality of matching features, wherein the plurality of matching features includes at least one matching topic of the plurality of content segments, wherein for the plurality of video segments, the at least one matching topic is determined in each of the plurality of video segments via at least one support vector machine comprising at least one topic identification classifier that is trained to recognize at least one topic in accordance with audiovisual features of the each of the plurality of video segments;
determining a first topic is part of a core topic of the subject based upon a number of instances of the first topic within the plurality of the content segments;
receiving a request from a user device for a course for the subject;
assembling the course for the subject, the course including at least one of the plurality of the content segments having the first topic that is determined to be part of the core topic; and
presenting the course to the user device.

20. A device comprising:
a processing system including at least one processor; and
a computer-readable medium storing instructions which, when executed by the processing system, cause the processing system to perform operations, the operations comprising:
identifying a plurality of content segments of a plurality of content sources of a subject having greater than a threshold similarity, wherein the plurality of content segments comprises a plurality of video segments, wherein the plurality of content segments is determined to have greater than the threshold similarity based upon a plurality of matching features, wherein the plurality of matching features includes at least one matching topic of the plurality of content segments, wherein for the plurality of video segments, the at least one matching topic is determined in each of the plurality of video segments via at least one support vector machine comprising at least one topic identification classifier that is trained to recognize at least one topic in accordance with audiovisual features of the each of the plurality of video segments;
determining a first topic is part of a core topic of the subject based upon a number of instances of the first topic within the plurality of the content segments;
receiving a request from a user device for a course for the subject;
assembling the course for the subject, the course including at least one of the plurality of the content segments having the first topic that is determined to be part of the core topic; and presenting the course to the user device.

\* \* \* \* \*